United States Patent
Sugimoto

(10) Patent No.: US 7,849,295 B2
(45) Date of Patent: Dec. 7, 2010

(54) DATA PROCESSING APPARATUS AND DATA PROCESSING METHOD INCLUDING DIVIDING DATA TO BE PROCESSED

(75) Inventor: Hideki Sugimoto, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 517 days.

(21) Appl. No.: 11/812,187

(22) Filed: Jun. 15, 2007

(65) Prior Publication Data

US 2008/0126756 A1  May 29, 2008

(30) Foreign Application Priority Data

Jun. 20, 2006  (JP) .............................. 2006-169736

(51) Int. Cl.
*G06F 9/00* (2006.01)
(52) U.S. Cl. ..................................... 712/226
(58) Field of Classification Search .................. 712/226
See application file for complete search history.

(56) References Cited

U.S. PATENT DOCUMENTS

| | | | | |
|---|---|---|---|---|
| 6,041,399 A * | 3/2000 | Terada et al. ................... 712/24 |
| 6,178,484 B1 * | 1/2001 | Arimilli et al. ............... 711/145 |
| 6,427,206 B1 * | 7/2002 | Yeh et al. ...................... 712/239 |
| 6,463,453 B1 * | 10/2002 | Dang .......................... 708/628 |
| 6,662,294 B1 * | 12/2003 | Kahle et al. .................. 712/226 |
| 2005/0289325 A1 * | 12/2005 | Sheaffer ...................... 712/210 |
| 2006/0149953 A1 * | 7/2006 | Wilson ........................ 712/245 |
| 2006/0288195 A1 * | 12/2006 | Ma et al. ..................... 712/226 |

FOREIGN PATENT DOCUMENTS

JP        2004-318670         11/2004

* cited by examiner

*Primary Examiner*—Jacob Petranek
(74) *Attorney, Agent, or Firm*—McGinn Intellectual Property Law Group, PLLC

(57) ABSTRACT

A data processing apparatus includes an operation processing unit and a data feature determining circuit. The operation processing unit is configured to sequentially perform preset operation processing on operation data in units of sub blocks to output an operation resultant data. Each of the operation data is divided into blocks, each of which comprises the sub blocks. The data feature determining circuit is configured to control the operation processing unit in units of blocks based on feature data respectively added to the blocks to indicate features of the blocks.

11 Claims, 11 Drawing Sheets

Fig. 7A

DATA PROCESSING APPARATUS AND DATA PROCESSING METHOD INCLUDING DIVIDING DATA TO BE PROCESSED

BACKGROUND OF THE INVENTION

1. Field of the Invention

The present invention relates to a data processing apparatus and a data processing method, and more specifically, to a data processing apparatus in which data to be processed is divided and processed, and a data processing method therefor.

2. Description of Related Art

In response to the need for processing a large quantity of data in recent years, improvement of speed of data processing is developed. In order to improve a processing speed, there may be a case where data processing is performed serially to attain shortening of a processing time. That is, there may be a case where a circuit configuration is simplified and thereby a cycle time is shortened.

A data processing apparatus that performs such a serial operation is disclosed in Japanese Laid Open Patent Publication (JP-P2004-318670A). The data processing apparatus includes a first parallel-to-serial conversion circuit, a second parallel-to-serial conversion circuit, a serial operation processing circuit, and a serial-to-parallel conversion circuit. The first parallel-to-serial conversion circuit divides a first parallel data into a predetermined number of first partial data, each of which is composed of a predetermined number of bits, and supplies the predetermined number of the first partial data one by one sequentially. The second parallel-to-serial conversion circuit divides second parallel data to a predetermined number of the second partial data, each of which is composed of a predetermined number of bits, and supplies the predetermined number of the second partial data one by one sequentially. The serial operation processing circuit performs operation processing on the predetermined number of the first partial data sequentially supplied and the predetermined number of the second partial data sequentially supplied for every partial data sequentially for a predetermined number of times. The serial-to-parallel conversion circuit receives a predetermined number of operation results of the operation processing circuit sequentially, combines them into one, and outputs the combination resultant data as a third parallel data.

In the data processing apparatus, both of an operation source data and an operation target data are parallel-to-serial converted, and are all calculated, and the calculation results are outputted. Therefore, an operation time is necessary in proportion to a word length of data subjected to the operation processing. Therefore, the arithmetic the data subjected to the arithmetic operation. If the unit of the operation processing is made small in order to speed up the operation processing, the number of times of the operation processing increases since the operation processing is repeated until the whole processing ends for data of the word length. Therefore, an occupancy time of the data processing apparatus and latency will increase. That is, an amount of data to be processed by the operation processing circuit is always equal to a maximum amount of data determined based on the word length, and for this reason, the reduction in a processing capability and the increase in power consumption are caused, as compared to a case of processing an amount of data, that is effective as data to be actually processed by the operation processing circuit, of the word length of data, i.e., a number of bits.

SUMMARY

The present invention provides a data processing apparatus with an improved operation processing capacity.

In one embodiment of the present invention, a data processing apparatus includes an operation processing unit and a data feature determining circuit. The operation processing unit is configured to sequentially perform preset operation processing on operation data in units of sub blocks to output an operation resultant data. Each of the operation data is divided into blocks, each of which comprises the sub blocks. The data feature determining circuit is configured to control the operation processing unit in units of blocks based on feature data respectively added to the blocks to indicate features of the blocks.

Also, the operation processing unit may include an operation processing circuit configured to sequentially perform the preset operation processing on the operation data in units of sub blocks to output the operation resultant data; a bypass circuit configured to output the operation data to bypass the operation processing circuit; and a selecting circuit configured to select and output one of the operation resultant data from the operation processing circuit and the operation data from the bypass circuit based on the feature data.

In another embodiment of the present invention, a data processing apparatus includes a register file, an operation processing unit, a bus interface section, and a data feature data adding circuit. The register file is configured to store a plurality of operation data through a register write bus. The operation processing unit is configured to perform specified operation processing based on a first operation data and a second operation data supplied from the register file and to output an operation resultant data to the register writing bus. Each of the first operation data and the second operation data is divided into a plurality of blocks, to each of which a data feature data is added to indicate a feature of the block. The bus interface section is configured to output data supplied from a memory unit to a data bus, and the data feature data adding circuit is configured to add the data feature data to the data on the data bus and to transfer the data with the data feature data onto the register write bus. The operation processing unit includes an operation processing circuit configured to perform the specified operation processing based on the first and second operation data and to output the operation resultant data to the register writing bus; a data feature determining circuit configured to control the specified operation processing of the operation processing circuit based on the data feature data of the first and second operation data; and a data feature data generating circuit configured to divide the operation resultant data into a plurality of blocks and adds the data feature data to each of the plurality of blocks.

In another embodiment of the present invention, a data processing method includes sequentially performing specified operation processing on operation data in units of sub blocks to generate an operation resultant data, wherein each of the operation data is divided into blocks, each of which comprises the sub blocks; and controlling the specified operation processing in units of blocks based on feature data respectively added to the blocks to indicate features of the blocks.

According to the present invention, it becomes possible to provide a data processing apparatus that can shorten an average occupancy time of an operation processing circuit and a latency that are needed in serial data processing or divisional data processing.

BRIEF DESCRIPTION OF THE DRAWINGS

The above and other objects, advantages and features of the present invention will be more apparent from the following description of certain preferred embodiments taken in conjunction with the accompanying drawings, in which;

FIGS. 7A to 7E are timing charts showing another operation of the execution unit;

PREFERRED EMBODIMENTS OF THE INVENTION

Hereinafter, a data processing apparatus according to an embodiment of the present invention will be described with reference to the attached drawings. In the present invention, an operation processing unit is controlled in accordance with a feature of data to be processed.

Figure 1:
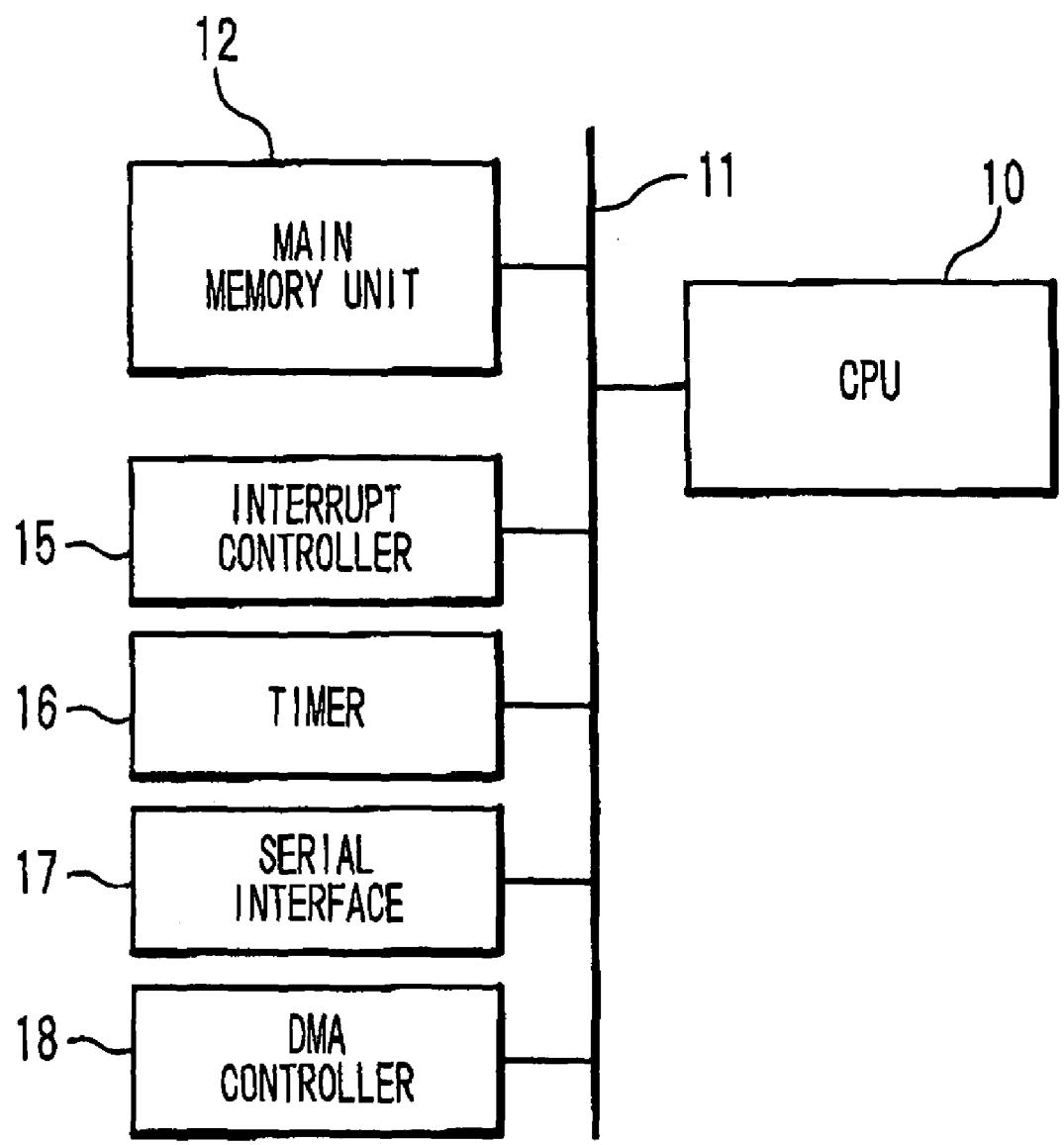
FIG. 1 is a block diagram showing a configuration of a data processing apparatus according to an embodiment of the present invention.

FIG. 1 is a block diagram schematically showing a configuration of the data processing apparatus according to the present invention. The data processing apparatus is composed of peripheral devices such as an interrupt controller 15, a timer 16, a serial interface 17, and a DMA controller 18 in addition to the operation processing unit (CPU) 10 and a main memory unit 12, all of which are connected with each other through a system bus 11. The operation processing unit 10 processes data stored in the main memory unit 12 and data taken from the serial interface 17 based on a program code stored in the main memory unit 12, and outputs the processing result to the main memory unit 12, the serial interface 17, or the like. The DMA controller 18 controls data transfer between an I/O unit such as the serial interface 17 and the main memory unit 12, or data transfer within the main memory unit 12, in place of the operation processing unit 10. The timer 16 measures a time based on a predetermined clock signal, and notifies the measured time to the operation processing unit 10 through the interrupt controller 15. The interrupt controller 15 controls an interrupt request issued by devices such as the timer 16, the serial interface 17, and the DMA controller 18, and notifies the interrupt request to the operation processing unit 10. The operation processing unit 10 includes a CPU (Central Processing Unit). It should be noted that peripheral devices are not limited to what are described above, and the data processing apparatus may be provided with various peripheral devices such as an input/output interface with an external device.

Figure 2:
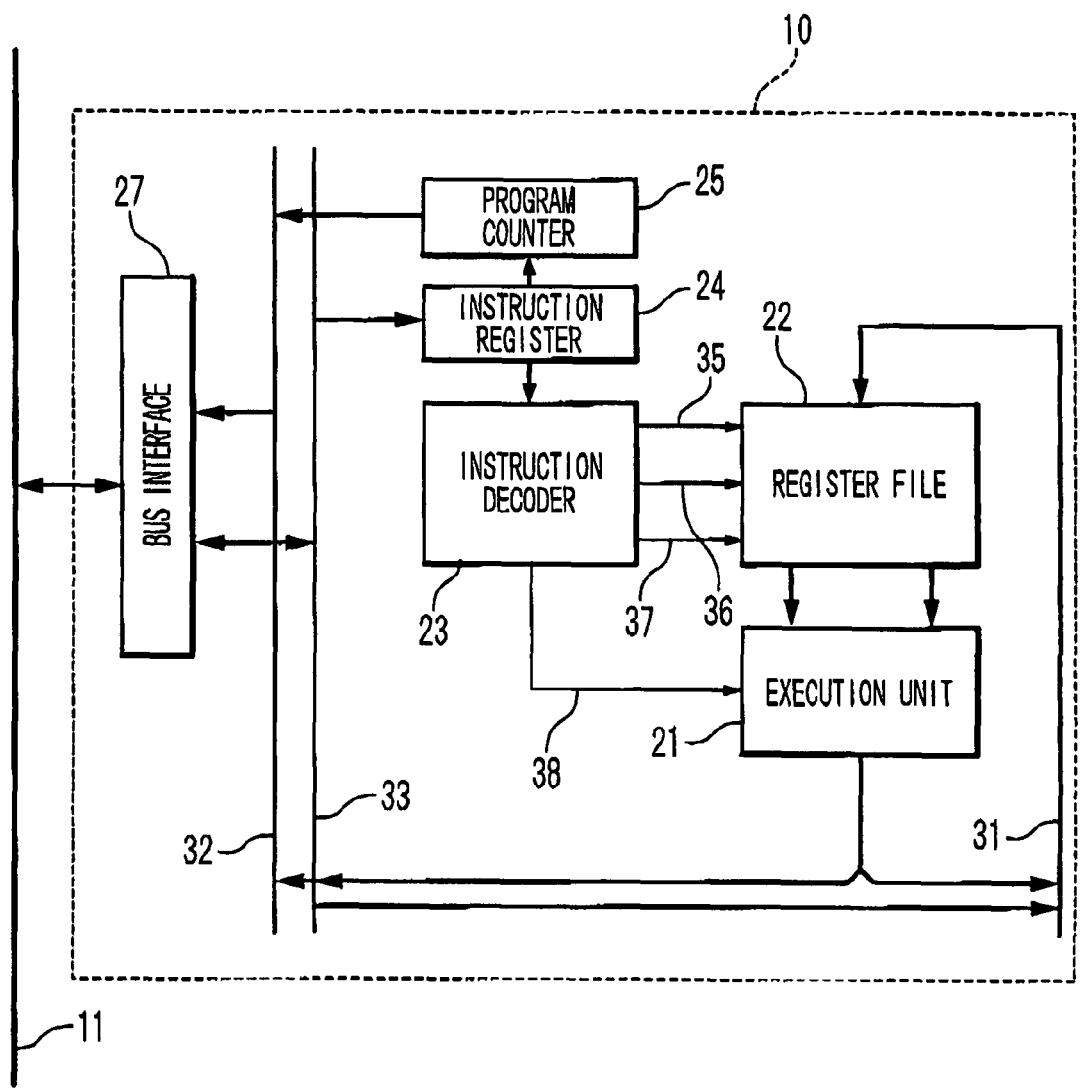
FIG. 2 is a block diagram showing a configuration of a data processing unit in the data processing apparatus according to the first embodiment of the present invention.

FIG. 2 is a block diagram showing the configuration of the operation processing unit (CPU) 10, The operation processing unit 10 is composed of an execution unit 21, a register file 22, an instruction decoder 23, an instruction register 24, a program counter 25, and a bus interface 27. The bus interface 27 connects the system bus 11 and both of an address bus 32 and a data bus 33. The address bus 32 is connected to the program counter 25 and the execution unit 21. A program address indicated by the program counter 25 shown by the address bus 32 or a data address calculated by the execution unit 21 is outputted to the system bus 11 via the bus interface 27.

An instruction code supplied from the system bus 11 via the bus interface 27 is stored in the instruction register 24 via the data bus 33. The instruction decoder 23 decodes the instruction code stored in the instruction register 24 to generate signals to control the execution unit 21 and the register file 22. The instruction register 24 outputs an address contained in the instruction code, for example, a jump target address to the program counter 25. The program counter 25 holds an address of the program to be executed one by one, or holds the jump target address supplied from the instruction register 24.

The instruction decoder 23 outputs an operation type indication signal 38 for indicating a type of an operation to the execution unit 21, and outputs a write register indication signal 35 and read register indication signals 36 and 37 to the register file 22 based on the instruction code stored in the instruction register 24. The register file 22 outputs data of the indicated register to the execution unit 21 based on the read register indication signals 36 and 37. Moreover, the register file 22 stores an operation result outputted from the execution unit 21 in a register indicated by the write register indication signal 35 via a register write bus 31. The execution unit 21 performs an operation such as addition and subtraction indicated by the operation type indication signal 38 on data supplied from the register file 22, and outputs the operation result to the register write bus 31, the address bus 32, and the data bus 33.

Figure 3:
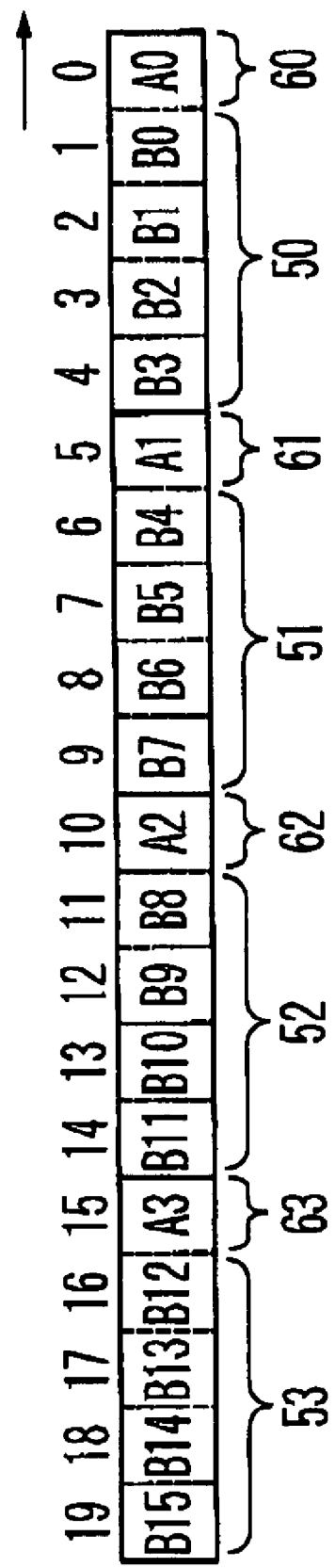
FIG. 3 is a diagram showing one example of a data format.

Data handled in the execution unit 21 is divided into several blocks, as shown in FIG. 3, and a data feature data is added to each block. Generally, there are a case where data as a target of an operation shows a certain feature value and a case where the data is arranged according to a certain rule (feature). Therefore, by dividing the data into a plurality of blocks and adding a feature of each block to that block, execution of the operation processing according to the feature of each block makes it possible to omit the operation processing on a block that does not need the operation processing, as compared with a usual operation. That is, the operation processing can be optimized locally. For example, data is characteristic in case where all the bits of the block are "0", all the bits are "1" (if the block is of four bits, "0001" in binary representation), and other cases. When all the bits of the block are "0", the operation result does not change even if an addition is performed. That is, since a carry is not generated, it is possible to increase operation speed. Moreover, if the operation is a multiplication, all the operation results become "0", and the operation result is found without doing a multiplication at all. Thus, throughput of the operation processing to be performed by the execution unit 21 is reduced to a throughput required for an actual operation processing, as compared with a maximum throughput determined by a word length.

FIG. 3 shows an example in which 16-bit data is divided into four blocks, each of which is composed of four bits. The 16-bit data from the least significant bit data B0 to the most significant bit data B15 is divided into four blocks: a block 50 of bits B0-B3, a block 51 of bits B4-B7, a block 52 of bits B8-B11, and a block 53 of bits B12-B15. A data feature data 60 (data A0) is added to the block 50, a data feature data 61 (data A1) is added to the block 51, a data feature data 62 (data A2) is added to the block 52, and a data feature data 63 (data A3) is added to the block 53. FIG. 3 shows the blocks and the data feature data being aligned in a line, to show that they are supplied to the execution unit 21 serially. The register file 22 may store the data feature data 60-63 in a localized manner. Data included in each block is not limited to 4 bits, and the number of blocks is not limited to 4. If handling 64-bit data, it may be divided into 8 bits×8 blocks, 4 bits×16 blocks, and so on. Data divided into the blocks is subjected to serial operation processing by every one bit or two or more bits. This operation unit is to be referred to as a sub block. The sub block may be one bit or two or more bits.

Figure 4:
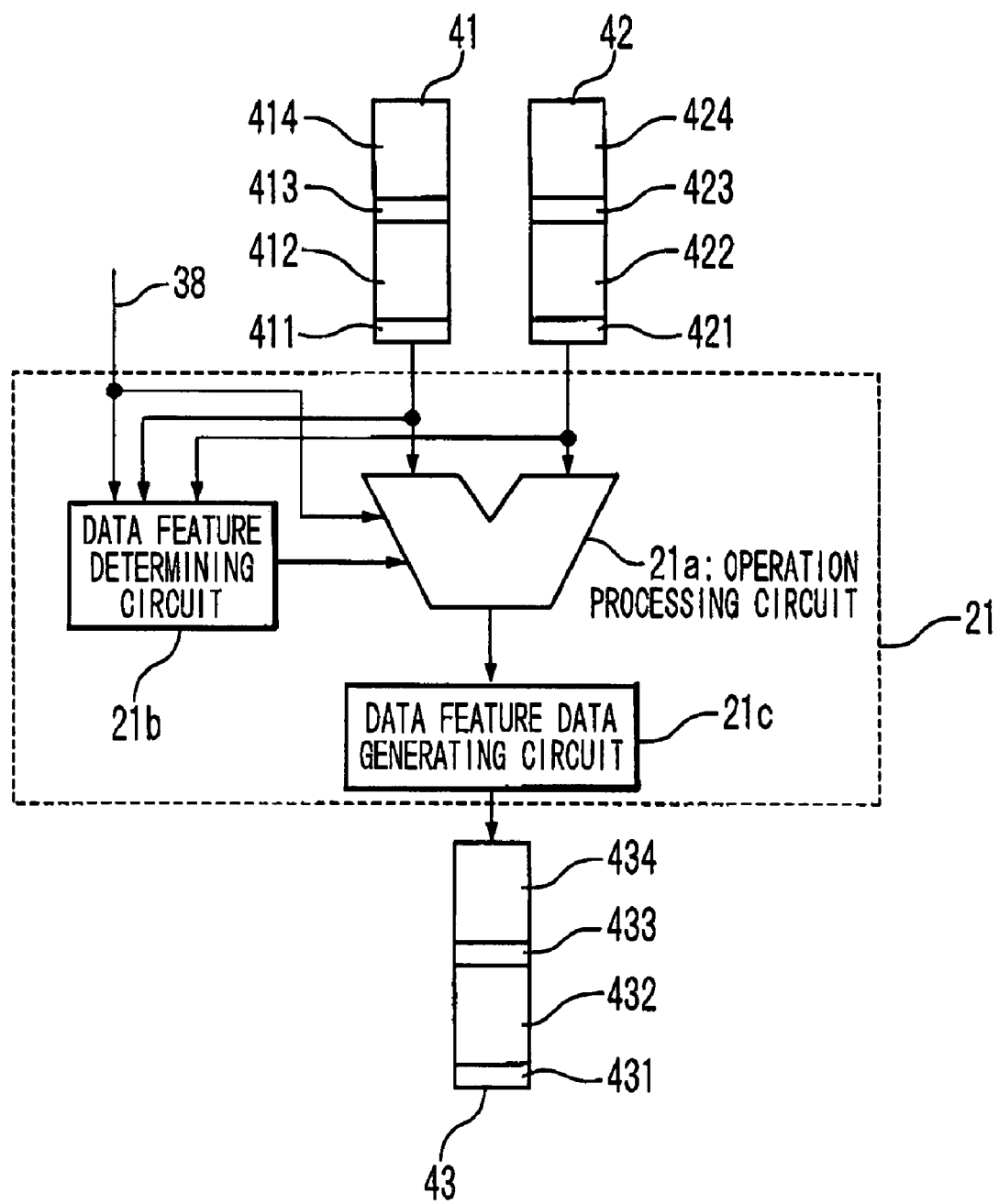
FIG. 4 is a diagram showing a configuration of an execution unit in the data processing apparatus according to the first embodiment of the present invention.

The execution unit 21 is composed of a operation processing circuit 21a, a data feature determining circuit 21b, and a data feature data generating circuit 21c, as shown in FIG. 4. An operation target data 41 to which the data feature data has been added and is a serial data, and an operation source data 42 are supplied to the operation processing circuit 21a from the register file 22. The instruction decoder 23 supplies the operation type indication signal 38 to the operation processing circuit 21a and the data feature determining circuit 21b. The operation processing circuit 21a serially performs specified operation processing to the operation target data 41 and the operation source data 42 based on the operation type indication signal 38. Based on the data feature data of the operation target data 41 and the operation source data 42, the data feature determining circuit 21b determines whether each of them has a feature in the operation processing indicated by the operation type indication signal 38, and outputs a determination result to the operation processing circuit 21a. The operation processing circuit 21a serially performs specified operation processing on the operation target data 41 and the operation source data 42 based on the result. The data feature data generating circuit 21c adds the data feature data to the operation result outputted from the operation processing circuit 21a, and the execution unit 21 outputs operation result data 43.

Figure 8A:
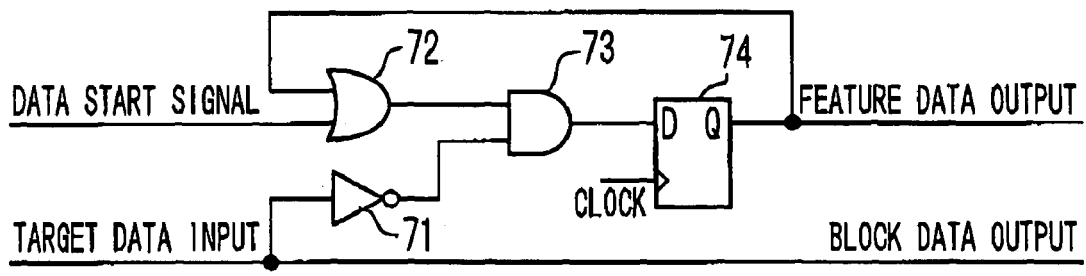
FIGS. 8A to 8D are diagrams showing configuration examples of a data feature data generating circuit in the present invention.

For example, when generating the data feature data indicating that all the bits are "0", the data feature data generating circuit 21c is composed of a NOT circuit 71, an OR circuit 72, an AND circuit 73, and a flip-flop 74, as shown in FIG. 8A. When the target data is supplied, the NOT circuit 71 inverts a logic level of the target data, the AND circuit 73 calculates a logical product of the inverted logic level and a past state of a feature data, and a current state of the feature data is set in the flip-flop 74. This operation is repeated on data supplied serially, and finally the feature data of the block is outputted from the flip-flop 74. It should be noted that the OR circuit 72 is a circuit for giving an initial value.

Figure 8B:
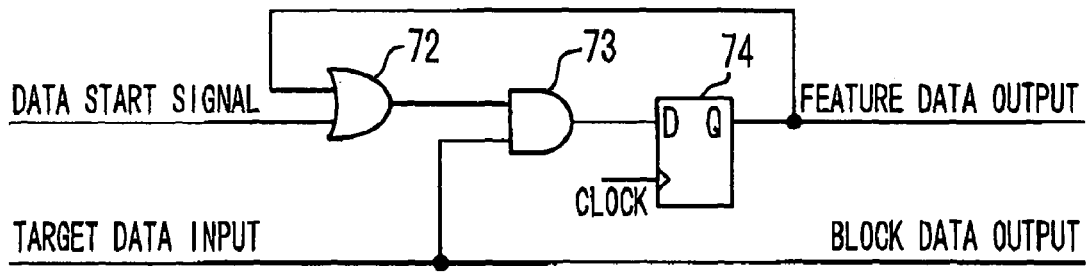

Moreover, when generating the feature data indicating that all the bits are "1", the data feature data generating circuit 21c is composed of the OR circuit 72, the AND circuit 73, and the flip-flop 74, as shown in FIG. 8B. In this case, the feature of data is only changed from "0" to "1", and the feature data can be generated by the circuit from which the NOT circuit 71 shown in FIG. 8A is omitted. Here, the data feature data 60 is a 1-bit configuration. The data feature data 60 is "1" to indicate existence of a feature when all the bits of the block 50 are "0", and is "0" otherwise. Thus, the existence/non-existence of feature is distinguished.

It should be noted that the existence/non-existence of the feature may be distinguished by a setting its bit to "1" to indicate the existence of the feature, when all the bits of the block 50 are "1", and the bit to "0", otherwise. Also, the existence of the feature is not limited to the bit of "1" and may be the bit of "0". The data feature data 60 is not limited to a 1-bit configuration. A configuration of 2 bits or more may be employed, to permit the determination of the existence/non-existence of the feature to be made in case that all the bits of the block 50 are "1" as well as a case that all the bits are "0". The feature data configuration may be employed for other feature data. The data feature data other than the block 50 may be configured like the data feature data 60.

An operation of the execution unit 21 will be described. As shown in FIG. 4, it is supposed that an operation target data 41 is 2-block data that is composed of a data feature data 411, a block 412, a data feature data 413, and a block 414. Similarly, it is supposed that an operation source data 42 is 2-block data that is composed of a data feature data 421, a block 422, a data feature data 423, and a block 424. It is assumed that all the bits of either or both of the block 412 and the block 422 are "0", and either or both of the block 411 and the block 421 are "1", to indicate the existence of feature. Bits of "0" and "1" exit mixedly in other blocks. Such an operation target data 41 and operation source data 42 are added.

FIGS. 5A to 5E are timing charts showing the operation of the execution unit 21 when the block is composed of 4 bits. FIG. 5A shows a timing of a clock signal indicating a fundamental operation time of the execution unit 21, and each clock cycle is designated by a reference symbol (T1-T12). A temporal relation of signals will be described using these symbols. The data feature data 411, the block 412, the data feature data 413, and the block 414 are supplied in this order as a target data input of the execution unit 21, while the data feature data 421, the block 422, the data feature data 423, and the block 424 are supplied in this order as a source data input.

Figure 5:
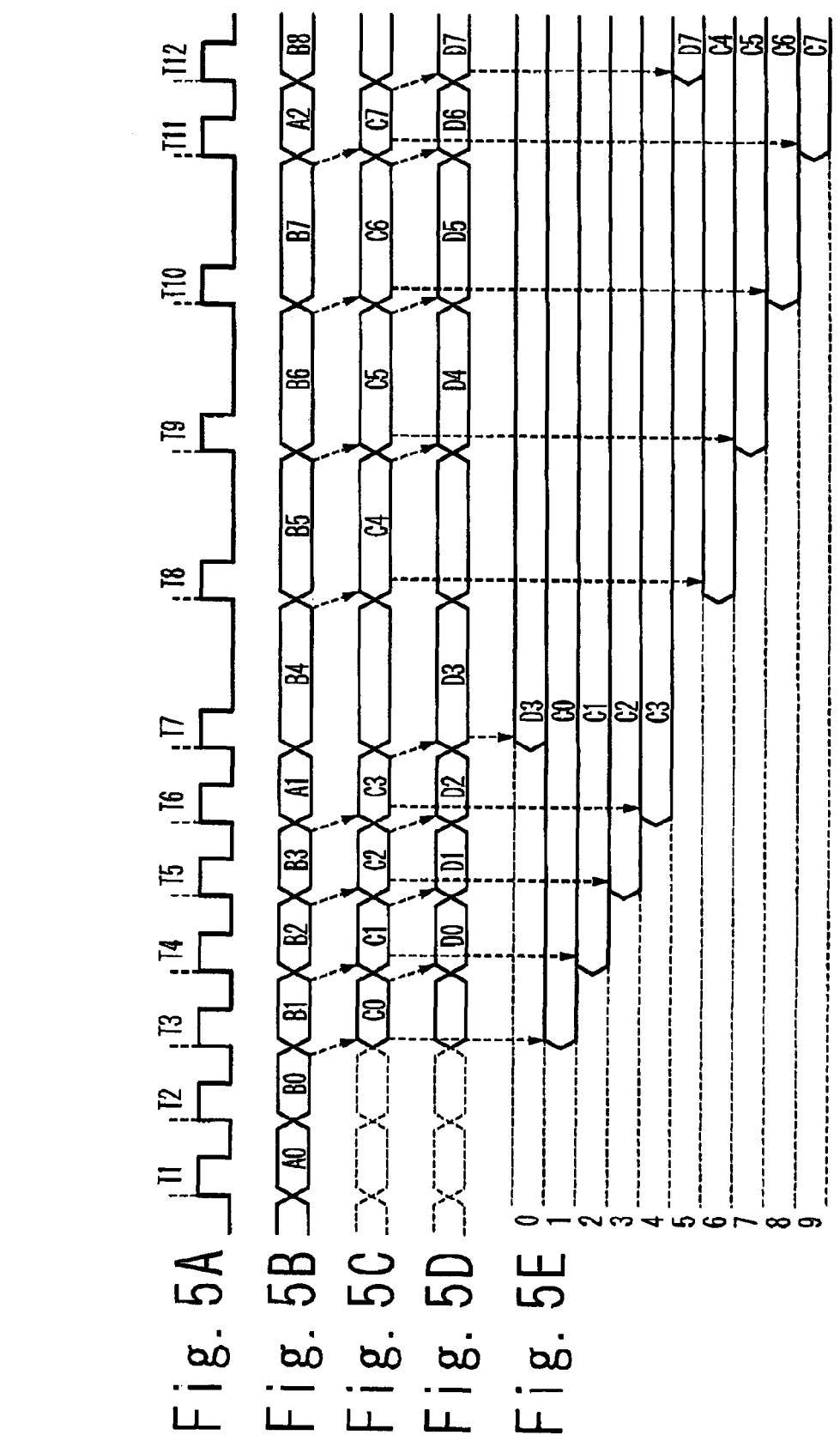
FIGS. 5A to 5E are timing charts showing an operation of the execution unit.

As shown in FIGS. 5A to 5E, the data feature data 411 indicating a feature of the block 412 and the data feature data 421 indicating a feature of the block 422 (FIG. 5B, A0) are supplied into the data feature determining circuit 21b to determine the existence/non-existence of the feature of the data before the block 412 and the block 422 are supplied into the operation processing circuit 21a (FIG. 5: clock cycle T1).

When the existence/non-existence of the feature is supplied into the operation processing circuit 21a, the operation of the operation processing circuit 21a is controlled depending on the existence/non-existence of the feature. Since the data feature data A0 indicates "1", i.e., indicating that there is a feature, there is no possibility of generation of a carry in an addition result. Therefore, a carry operation is omitted, and the operation time is shortened. The result determined in the clock cycle T1 is reflected on the clock cycles T2-T5. In the clock cycle T2, a bit data (FIG. 5B, B0) supplied into the operation processing circuit 21a is added, and an addition result (FIG. 5C, C0) is outputted therefrom in the clock cycle T3. The addition result (FIG. 5C, C0) is stored in a predetermined bit position of the register for storing operation results (FIG. 5E, 1). Based on the addition result (FIG. 5C, C0), the data feature data generating circuit 21c calculates a data feature data, and outputs an intermediate result (FIG. 5D, D0) in the clock cycle T4.

In the clock cycle T3, the second bit data (FIG. 5B, B1) of the blocks 412 and 422 are supplied into the operation processing circuit 21a, and added therein. The addition result (FIG. 5C, C1) is outputted in the clock cycle T4. Based on this addition result (FIG. 5C, C1) and an intermediate result (FIG. 5D, D0) of the stored data feature data, the operation processing of the data feature data is performed and the intermediate result (FIG. 5D, D1) is obtained in the clock cycle T5. Similarly, data of the third bits (FIG. 5B, B2) of the blocks 412 and 422 are supplied into the operation processing circuit 21a in the clock cycle T4, and the last bits (FIG. 5B, B3) of the blocks 412 and 422 are supplied therein in the clock cycle T5, to perform an add operation on the supplied bits. The operation results (FIG. 5C, C2 and C3) are outputted in the clock cycles T5 and T6, respectively.

In the clock cycle T7 after the add operation of the last bits of the first blocks is completed, the operation result (FIG. 5D, D3) of the data feature data is outputted and is stored in a predetermined bit position of the register for storing the operation results (FIG. 5E, 0). Therefore, in the clock cycle T7, the operation results of the first block are all present.

At this time, the operation processing of the next block is already started. In the clock cycle T6, data feature data 413 and 423 (FIG. 5B, A1) of the second blocks are supplied into the data feature determining circuit 21b. The data of the second blocks are "0", i.e., data indicating that there is no feature, and a usual addition is performed. Therefore, since there is a possibility of a carry operation, the operation time of the clock cycles T7-T10 becomes long, compared with a case of "the existence of a feature".

In the clock cycle T7, data of the first bits of the second blocks (FIG. 5B, B4) are supplied and an add operation is performed on them. The addition result (FIG. 5C, C4) is outputted in the clock cycle T8, and is stored in a predetermined bit position of the register for storing operation results (FIG. 5E, B6). The data feature data generating circuit 21c initializes the intermediate result of the data feature data based on this addition result (FIG. 5C, C4), and generates an intermediate result D4 in the clock cycle T9 (FIG. 5D, D4). Similarly, in the clock cycles T8-T10, data of the respective bits (FIG. 5B, B5-B7) are supplied into the operation processing circuit 21a sequentially, and addition is performed serially. In the clock cycles T9-T11, the addition results (FIG. 5C, C5-C7) are outputted, and the data feature data is generated based on the addition results (FIG. 5D). Therefore, in the clock cycle T12, the data feature data (FIG. 5D, D7) for the operation result of the second blocks is generated and set in a predetermined bit position (FIG. 5E, 4). That is, it means that in the clock cycle T12, the operation result data 43 that is composed of a data feature data 431, a block 432, a data feature data 433, and a block 434 is outputted from the execution unit 21, as shown in FIG. 4.

In this way, by assigning each block with the data feature data, it is made possible to shorten the operation time. Here, the following description is given, taking the execution unit that performs serial 1-bit addition, as an example. The execution unit may perform 4-bit operation processing. The above-described one bit corresponds to 4-bit data, and 1 block becomes 16-bit data. If adopting a 1-word of four blocks, it is possible to perform the operation processing on data of a word length of 64 bits. The division number of blocks is not limited to four. Moreover, although the execution unit that starts the operation processing from a low-order bit in the present embodiment has been described, the operation processing may be started from a high-order bit, depending on the type of the operation processing. Furthermore, although alteration in the operation processing time is indicated based on a time of clock cycle, the number of clocks during the operation processing may be altered, or they may be combined.

Figure 6:
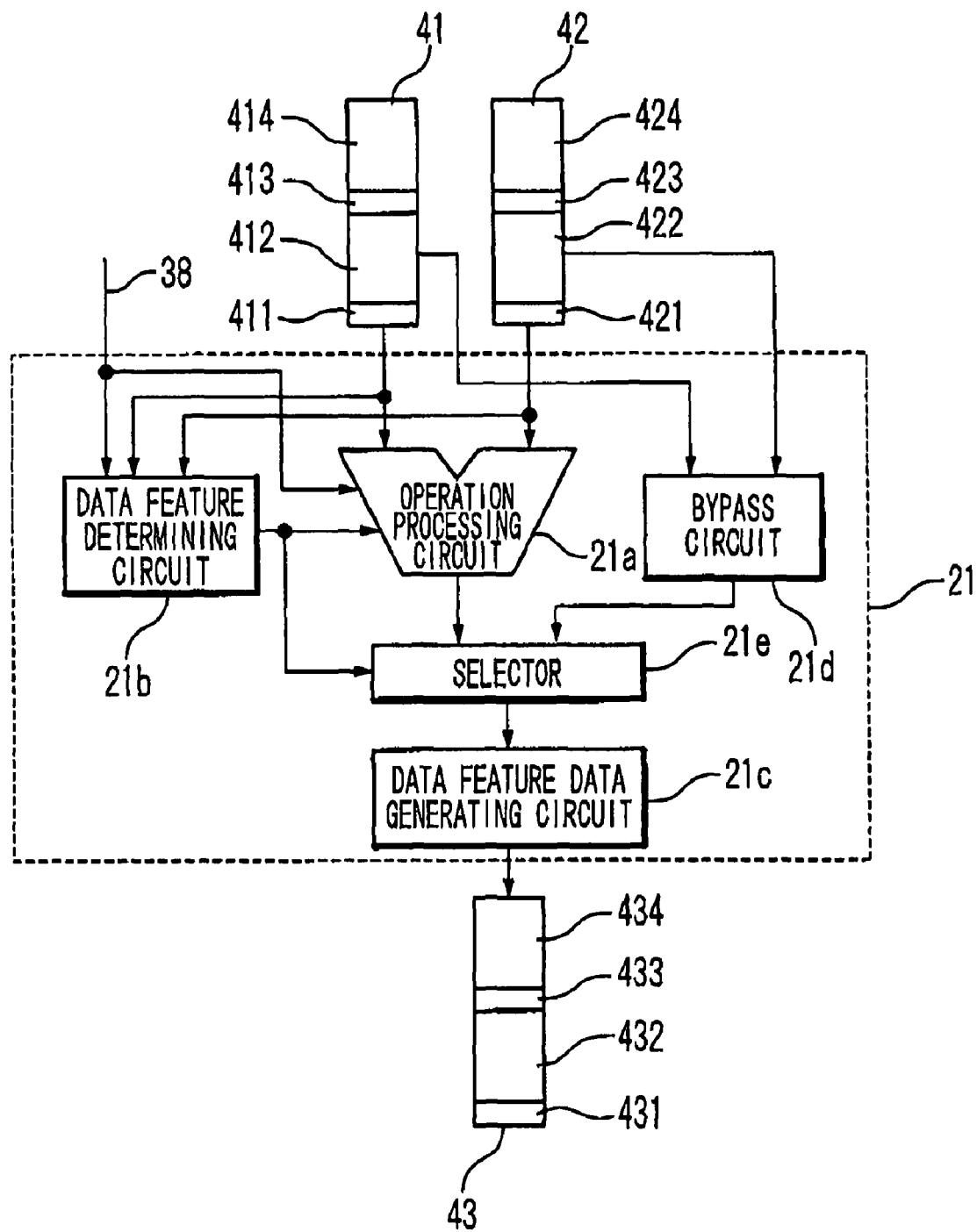
FIG. 6 is a diagram showing another configuration of the execution unit in the data processing apparatus according to the first embodiment of the present invention.

Next, an execution unit will be described which further includes an operation bypass circuit for shortening an operation time. FIG. 6 is a block diagram showing another configuration of the execution unit 21 with the operation bypass circuit. The execution unit 21 is composed of the operation processing circuit 21a, the data feature determining circuit 21b, the data feature data generating circuit 21c, a bypass circuit 21d, and a selector 21e. The operation processing circuit 21a is supplied with the operation target data 41 as a serial data to which the data feature data has been added and the operation source data 42 from the register file 22.

The instruction decoder 23 supplies the operation type indication signal 38 to the operation processing circuit 21a and the data feature determining circuit 21b. In response to the operation type indication signal 38, the operation processing circuit 21a serially performs specified operation processing between the operation target data 41 and the operation source data 42, and outputs an operation result to the selector 21e. Based on data feature data of the operation target data 41 and the operation source data 42, the data feature determining circuit 21b determines whether it is data having a feature in the operation processing instructed by the operation type indication signal 38, and outputs a determination result to both of the operation processing circuit 21a and the selector 21e. On the other hand, the bypass circuit 21d is supplied with the operation target data 41 and the operation source data 42, and outputs them to the selector 21e without any operation. The selector 21e selects either an output of the operation processing circuit 21a or an output of the bypass circuit 21d, and outputs the selected data to the data feature data generating circuit 21c. The data feature data generating circuit 21c determines a feature of the supplied data, and adds the data feature data thereto. Accordingly, the execution unit 21 outputs the operation result data 43 to which the data feature data has been added.

This means that a path other than a path passing through the operation processing circuit 21a is provided by the bypass circuit 21d. When the bypass circuit 21d outputs a bypass data in synchronization with the operation processing circuit 21a, the bypass circuit 21d performs a same operation at the same timing as that of the execution unit 21 described by FIGS. 4 and 5. Since the bypass circuit 21d allows input data to be bypassed, when the bypass circuit 21d inputs/outputs block data in parallel, it becomes possible to process the data faster as compared with a case where the data is processed by the operation processing circuit 21a. FIGS. 7A to 7E show the timing.

The operation target data 41 is supposed to be 2-block data that has the data feature data 411, the block 412, the data feature data 413, and the block 414, as shown in FIG. 6. Similarly, the operation source data 42 is supposed to be 2-block data that has the data feature data 421, the block 422, the data feature data 423, and the block 424. Here, it is assumed that all the bits of one or both of the blocks 412 and 422 are "0" and one or both of the data feature data 411 and 421 are "1", which indicates a state in which a feature is present. It is further assumed that all the bits of one or both of the blocks 414 and 424 are "0" and one or both of the data feature data 413 and 423 are "1", which indicates a state in which a feature is present. Such an operation target data 41 and operation source data 42 are added. In this case, the operation processing is an addition. Since the data of one of them is "0", one of the blocks 412 and 422 and one of the blocks 414 and 424 are selected and outputted by the selector 21e as they are. Therefore, a result is obtained without practically performing the operation processing.

FIG. 7A shows timing of a clock signal indicating a fundamental operation time of the execution unit 21, and clock cycles are designated by respective symbols (T1-T6). The temporal relations of the signals will be described using these symbols.

Figure 7B:
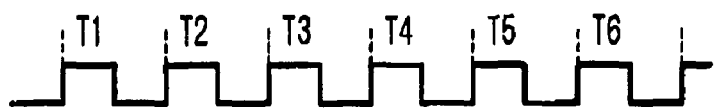

In the clock cycle T1, the data feature data 411 of the operation target data 41 and the data feature data 421 of the operation source data 42 are supplied into the data feature determining circuit 21b (FIG. 7B, A0). Since at least one of the data feature data 411 and 421 indicates that the block data is "0", the data feature determining circuit 21b informs to the operation processing circuit 21a, that the operation processing can be omitted.

Figure 7C:
Figure 7D:
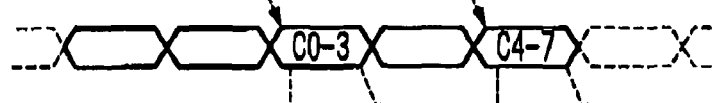

In the clock cycle T2, the data of the blocks 412 and 422 are supplied in parallel to the bypass circuit 21d (FIG. 7B, B0-B3). Since the operation processing is the addition, the bypass circuit 21d outputs the block data that is not "0" in the clock cycle T3 (FIG. 7C, C0-3). However, when both the blocks are "0", data of either block is outputted. The selector 21e selects and outputs the block data outputted from the bypass circuit 21d based on the determination result outputted from the data feature determining circuit 21b. In the clock cycle T3, the operation result (FIG. 7C, C0-3) is set in a predetermined bit position of the register for storing operation results (FIG. 7E, 1-4).

Figure 7E:
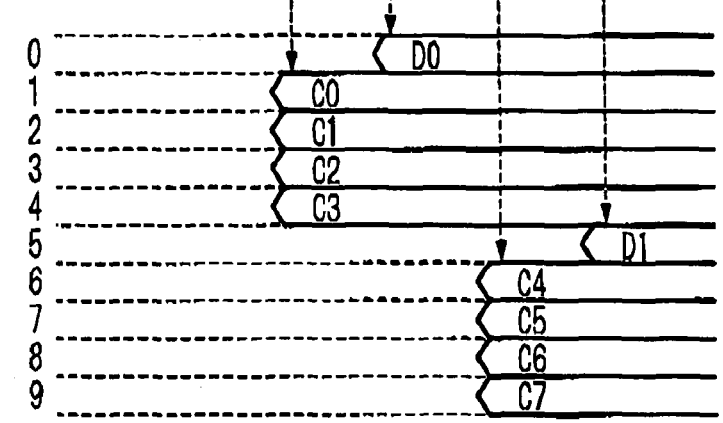
Figure 8C:
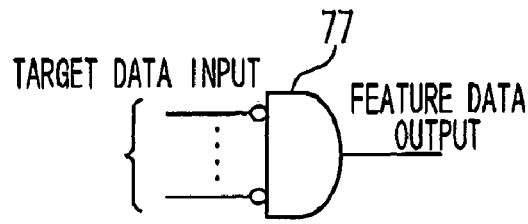
Figure 8D:
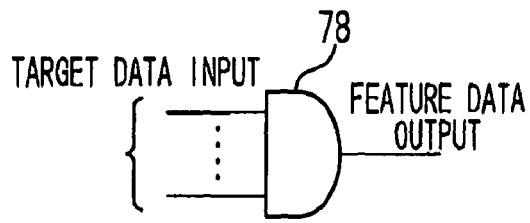

The data feature data generating circuit 21c adds the data feature data to the data outputted from the selector 21e, and outputs the addition resultant data in the clock cycle T4 (FIG. 7D, D0), which is stored in a predetermined bit position of the register for storing the operation results (FIG. 7E, 0). When it is determined that all the bits of parallel data are "0", the data feature data generating circuit 21c only needs to include a multi-bit Not OR circuit 77, as shown in FIG. 8C. Also, it is possible to output the operation result in the clock cycle T3. Moreover, the timing at which the operation result (C0-C3) is stored in a predetermined bit position may be set to the clock cycle T4. Whether all the bits of the parallel data are "1" can be determined by a multi-bit AND circuit 78, as shown in FIG. 8D.

Similarly, in the clock cycle T3, the data feature data 413 of the second block of the operation target data 41 and the data feature data 423 of the second block of the operation source data 42 are supplied into the data feature determining circuit 21b (FIG. 7B, A1). Since at least one of the data feature data 413 and 423 indicates that the block data is "0", the data feature determining circuit 21b informs to the operation processing circuit 21a, that the operation processing can be omitted.

In the clock cycle T4, data of the blocks 414 and 424 are supplied in parallel to the bypass circuit 21d (FIG. 7B, B4-B7). The bypass circuit 21d outputs the block data that is not "0" in the clock cycle T5 (FIG. 7C, C4-C7). However, when the both the blocks are "0", the data of either of the blocks is outputted. The selector 21e selects and outputs the block data outputted from the bypass circuit 21d based on the determination result outputted from the data feature determining circuit 21b. In the clock cycle T5, the operation result (FIG. 7C, C4-7) is set in a predetermined bit position of the register for storing operation results (FIG. 7E, 6-9).

The data feature data generating circuit 21c adds the data feature data to the data outputted by the selector 21e, and outputs the addition resultant data in the clock cycle T6 (FIG. 7D, D1), which is stored in a predetermined bit position of the register for storing operation results (FIG. 7E, 5). Thus, provision of the bypass circuit 21d makes it possible to obtain the operation result data 43 directly, not via the operation processing circuit 21a, and therefore can shorten the operation time largely.

Although a case of addition is shown in the present embodiment, other operations can also be omitted similarly by means of the data feature. For example, when performing a multiplication with data of "0", omission of the operation processing becomes possible since the operation results become all bits of "0". In this case, since the operation results are fixed to "0", the data processing apparatus can also be configured to generate and output "0" data.

As described above, it becomes possible that, the operation data is divided into a plurality of blocks, a data indicating a feature of the data contained in each block is added to the data of the block, and the execution unit omits a part or the whole of the operation based on the feature of the data. Therefore, it becomes possible to decrease an average occupancy time of the operation processing circuit and latency that are required for serial arithmetic processing or division arithmetic processing, so that an improvement of processing capability and a reduction in power consumption can be realized.

In this way, the data feature data is added to the operation result data. When the operation result data is going to be stored in the register file 22, the data feature data is added. A position at which the data feature data is added to the data that is being supplied into the register file 22 from the outside, such as the main memory unit 12, will be described referring to the drawings.

For example, when all the bits in the block indicate "0", the data feature data can be generated by a simple circuit as shown in FIG. 8A for serial data and in FIG. 8C for parallel data. Moreover, when all the bits in the block indicate "1", the data feature data can be generated by a simple circuit as shown in FIG. 8B for serial data and in FIG. 8D for parallel data. The data feature data generating circuit is such that these circuits are arranged properly according to a position.

Figure 9:
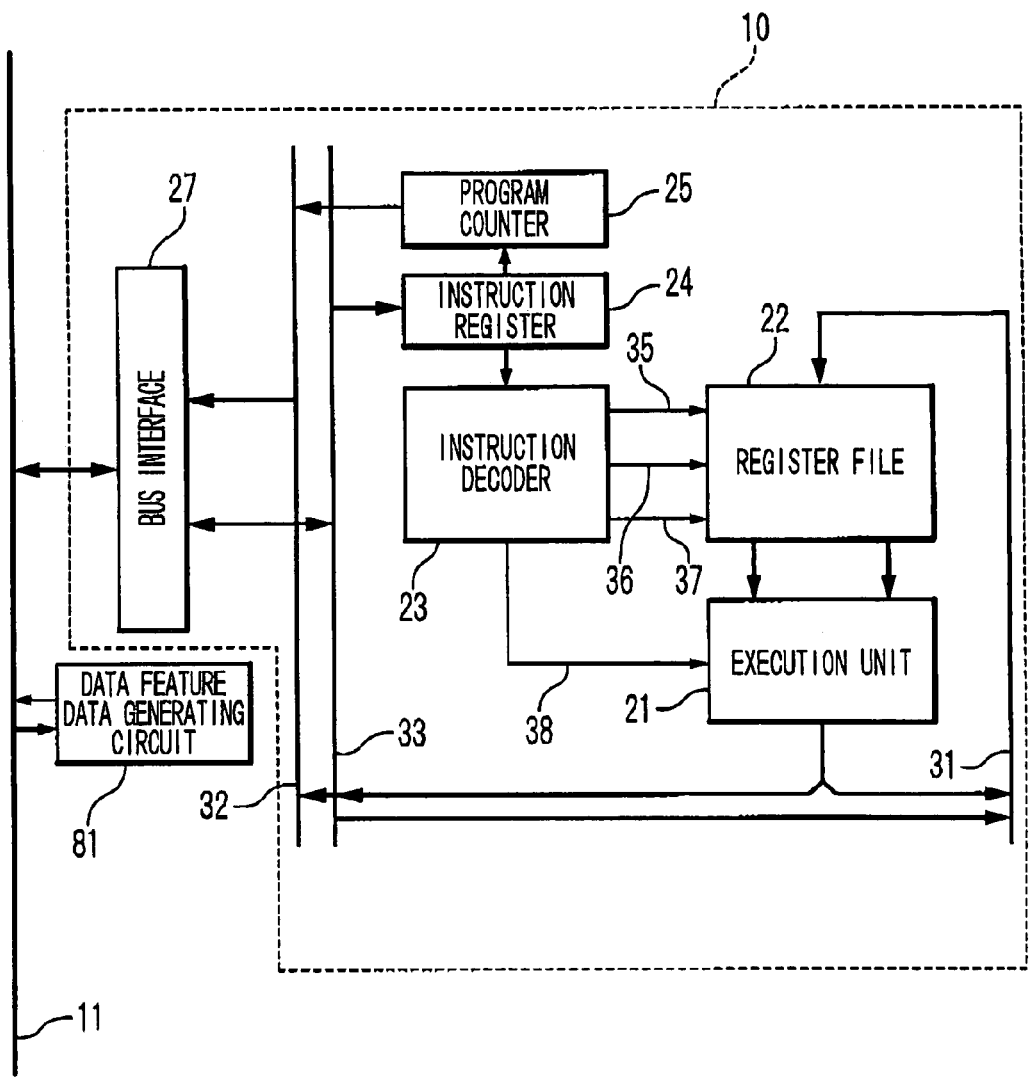
FIG. 9 is a diagram showing the data feature data generating circuit provided in a position.

FIG. 9 shows the configuration in case that the data feature data is added to a data stored in the main memory unit 12. A data feature data generating circuit 81 is connected to the system bus 11. The data feature data generating circuit 81 supervises the system bus 11, generates the data feature data for the data that is transferred to the main memory unit 12 or the operation processing unit 10 from an I/O unit such as the timer 16 and the serial interface 17, and adds it thereto. The operation processing unit 10 receives the data to which a data feature data has been added, and stores it in the register file 22. The data feature data is generated in the data feature data generating circuit 81 of the execution unit 21 of the operation processing unit 10 and is also transferred to the system bus 11. Therefore, the data feature data is added to the data to be stored in the main memory unit 12. The storage capacity of the main memory unit 12 is increased by a portion for storing the data feature data. However, since the data feature data is added in the system bus 11 having comparatively few restrictions of speed, addition processing of the data feature data exerts little influence on the operation processing unit 10. Moreover, through this configuration, the whole system will be described to use this data feature data.

Figure 10:
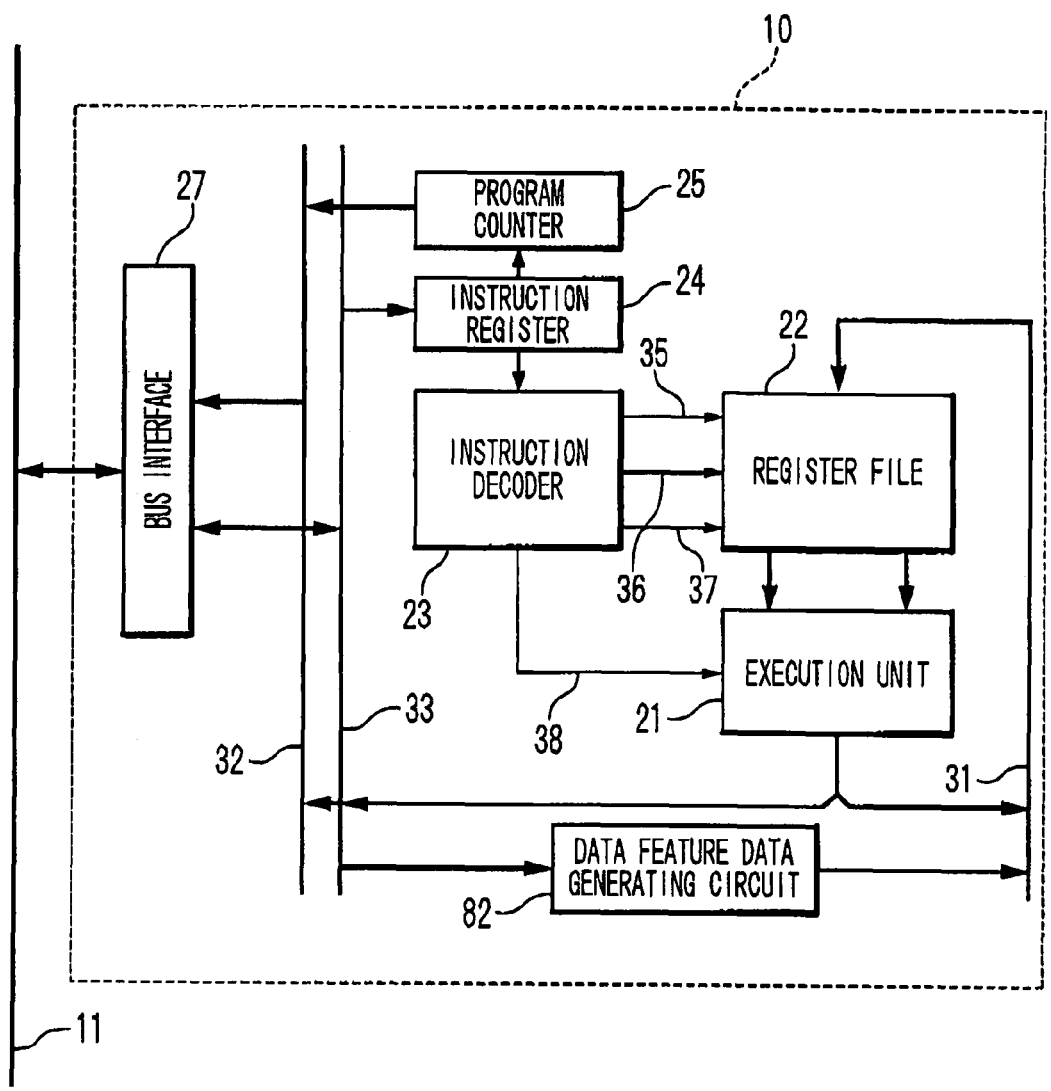
FIG. 10 is a diagram showing the data feature data generating circuit provided in another position.

In another configuration example of the operation processing unit 10 shown in FIG. 10, the data feature data becomes effective only within the operation processing unit 10. The data supplied via the bus interface 27 is supplied to a data feature data generating circuit 82 via the data bus 33. The data to which the data feature data has been added in the data feature data generating circuit 82 is stored in the register file 22 via the register write bus 31. Since the data path 33 transmits parallel data concurrently with input of the data into the operation processing unit 10, the data feature data is added to the data, and is stored in the resister file 22. Therefore, the addition of the data feature data does not influence processing speed of the operation processing unit 10. The data feature data is referred only when the data is processed within the operation processing unit 10. When the data is outputted to the system bus 11 from the bus interface 27, the data feature data is deleted, and a usual data is stored in the main memory unit.

Figure 11:
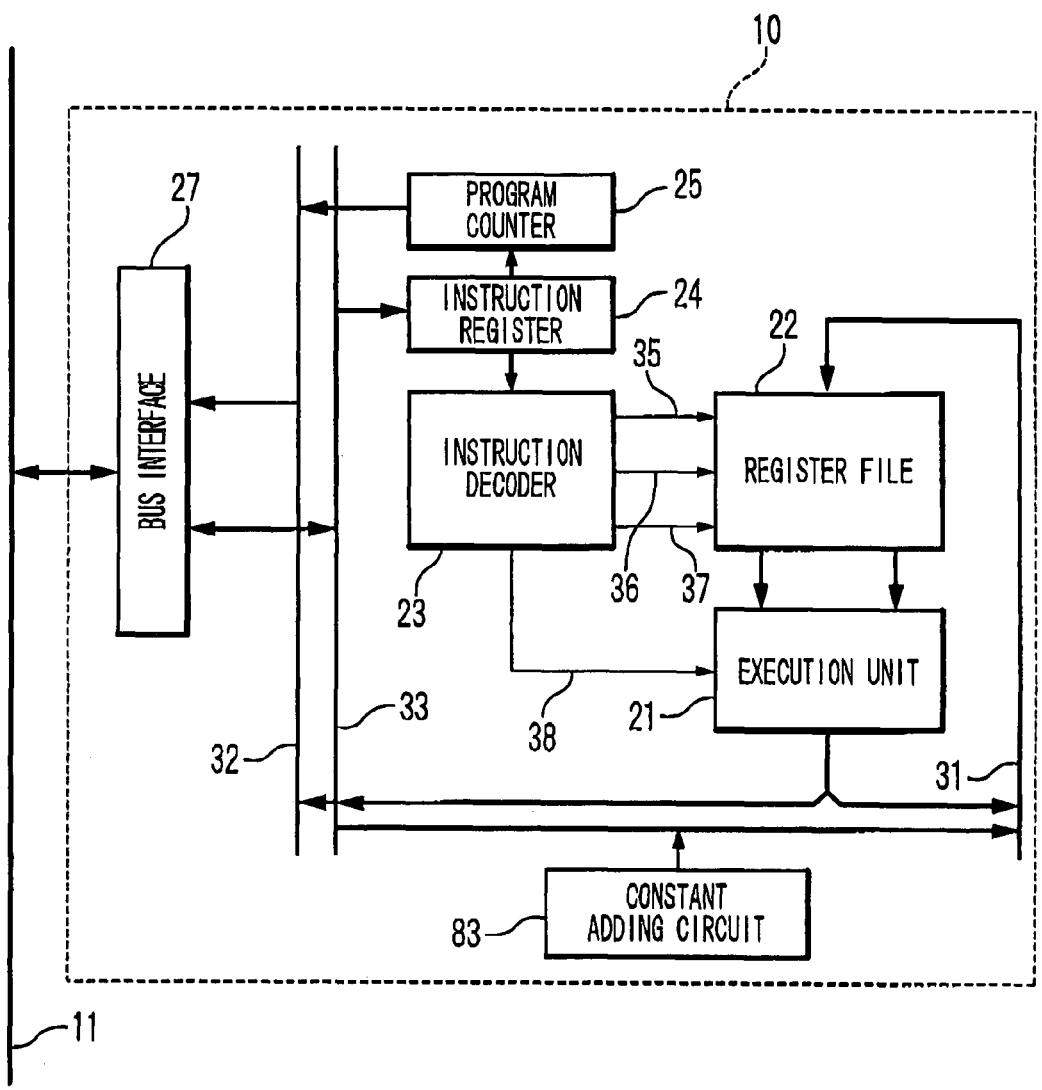
FIG. 11 is a diagram showing a fixed data adding circuit.

A configuration example of the operation processing unit 10 shown in FIG. 11 is almost the same as the configuration example shown in FIG. 10, but the data feature data indicating that data supplied via the bus interface 27 has no feature is added to the former. That is, "non-existence of a feature" is added to the data that is to be transferred to the register write bus 31 from the data bus 33, irrespective of the existence/non-existence of a feature. Therefore, it is not necessary to determine contents of the supplied data, and accordingly a constant adding circuit 83 is simple and can perform operation processing at a high speed. It should be noted that as the operation processing circuit, there is an ALU (Arithmetic Logical Unit) for performing four rules and logical operations as a general example. The present invention is not limited to this, and for example, the operation processing circuit may be a circuit for performing a floating point arithmetic operation (FPU) and other arithmetic operation.

In this way, the use of the operation processing circuit using the data feature data enables arithmetic processing capacity of the data processing apparatus to be improved. Moreover, it becomes possible to shorten the average occupancy time of the operation processing circuit and the latency that are required for serial arithmetic processing or division arithmetic processing. Therefore, improvement of processing capability of the data processing apparatus and reduction in power consumption become possible.

Although the present inventions has been described above in connection with several embodiments thereof, it will be apparent by those skilled in the art that those embodiments are provided solely for illustrating the invention, and should not be relied upon to construe the appended claims in a limiting sense.

What is claimed is:

1. A data processing apparatus comprising:
   an operation processing unit configured to sequentially perform preset operation processing on operation data in units of sub-blocks to output an operation resultant data, wherein each of the operation data is divided into blocks, each of which comprises the sub-blocks; and
   a data feature determining circuit configured to control said operation processing unit in units of blocks based on feature data respectively added to said blocks to indicate features of said blocks,
   wherein said feature data indicates whether all bits of each of said sub-blocks of said block is "0".

2. The data processing apparatus according to claim 1, wherein said operation processing unit comprises:
   an operation processing circuit configured to sequentially perform said preset operation processing on said operation data in units of sub-blocks to output the operation resultant data;
   a bypass circuit configured to output said operation data to bypass said operation processing circuit; and
   a selecting circuit configured to select and output one of said operation resultant data from said operation processing circuit and said operation data from said bypass circuit based on said feature data.

3. The data processing apparatus according to claim 1, wherein said operation processing unit further comprises:
   a first data feature data generating circuit configured to generate a feature data based on said operation resultant data, and to add said feature data to a block corresponding to said operation resultant data.

4. The data processing apparatus according to claim 1, wherein said operation processing unit further comprises:
   a register set configured to store said operation data; and
   a second data feature data generating circuit configured to add said feature data to each of said blocks of said operation data based on said operation data.

5. The data processing apparatus according to claim 1, further comprising;
   a main memory unit;
   a third data feature data generating circuit configured to add said feature data to each of said blocks of a data to be stored in said main memory unit based on said data.

6. The data processing apparatus according to claim 1, wherein said operation processing unit further comprises:
   a register set configured to store said operation data; and
   a fixed data adding circuit configured to add a predetermined data as said feature data to each of said blocks of said operation data.

7. The data processing apparatus according to claim 1, wherein said data feature determining circuit determines whether each of said features of said blocks comprises a feature in an operation processing in response to an operation type signal indicating a type of an operation, thereby generating a determination resultant signal, and
   wherein said operation processing unit controls said operation processing based on said determination resultant signal.

8. The data processing apparatus according to claim 7, further comprising:
   an instruction decoder coupled to said data feature determining circuit, and configured to generate said operation type signal based on a program code.

9. A data processing apparatus comprising:
   an operation processing unit configured to sequentially perform preset operation processing on operation data in units of sub-blocks to output an operation resultant data, wherein each of the operation data is divided into blocks, each of which comprises the sub-blocks; and
   a data feature determining circuit configured to control said operation processing unit in units of blocks based on feature data respectively added to said blocks to indicate features of said blocks,
   wherein said feature data indicates whether all bits of each of said sub-blocks of said block is "1".

10. A data processing apparatus comprising:
    an operation processing unit configured to sequentially perform preset operation processing on operation data in units of sub-blocks to output an operation resultant data, wherein each of the operation data is divided into blocks, each of which comprises the sub-blocks; and
    a data feature determining circuit configured to control said operation processing unit in units of blocks based on feature data respectively to said blocks to indicate features of said blocks,
    wherein said feature data indicates whether only a least significant bit of said block is "1".

11. A data processing apparatus comprising:
    a register file configured to store a plurality of operation data through a register writing bus;
    an operation processing unit configured to perform specified operation processing based on a first operation data and a second operation data supplied from said register file and to output an operation resultant data to said register writing bus, wherein each of said first operation data and said second operation data is divided into a plurality of blocks, to each of which a data feature data is added to indicate a feature of said plurality of blocks;

a bus interface section configured to output data supplied from a memory unit to a data bus; and a data feature data adding circuit configured to add said data feature data to said data on said data bus and to transfer said data with said data feature data onto said register writing bus, wherein said operation processing unit comprises:

an operation processing circuit configured to perform the specified operation processing based on said first and second operation data and to output said operation resultant data to said register writing bus;

a data feature determining circuit configured to control the specified operation processing of said operation processing circuit based on said data feature data of said first and second operation data; and a data feature data generating circuit configured to divide said operation resultant data into a plurality of blocks, and to add said data feature data to each of said plurality of blocks.

* * * * *